United States Patent [19]
Knipper et al.

[11] Patent Number: 5,415,882
[45] Date of Patent: *May 16, 1995

[54] PRODUCING EXTENDED REFRIGERATED SHELF LIFE FOOD WITHOUT HIGH TEMPERATURE HEATING

[76] Inventors: Aloysius J. Knipper, 227 Cupsaw Dr., Ringwood, N.J. 07456; David Reznik, 2151 Barbara Dr., Palo Alto, Calif. 94303

[ * ] Notice: The portion of the term of this patent subsequent to Mar. 1, 2011 has been disclaimed.

[21] Appl. No.: 7,555

[22] Filed: Jan. 22, 1993

Related U.S. Application Data

[63] Continuation-in-part of Ser. No. 862,198, Apr. 2, 1992, Pat. No. 5,290,583.

[51] Int. Cl.$^6$ ............................................. A23B 5/01
[52] U.S. Cl. ................................. 426/237; 219/771; 426/238; 426/244; 426/521; 426/614
[58] Field of Search ............... 426/614, 234, 237, 238, 426/244, 465, 521; 99/451, 358, DIG. 10; 219/10.81, 477, 480, 482

[56] References Cited

U.S. PATENT DOCUMENTS 1,522,188  1/1925  Hull .

(List continued on next page.)

FOREIGN PATENT DOCUMENTS

| | | |
|---|---|---|
| 904371 | 8/1962 | United Kingdom . |
| 2068200 | 8/1981 | United Kingdom . |
| WO89/0038 | 1/1989 | WIPO . |
| WO9319620 | 10/1993 | WIPO . |

OTHER PUBLICATIONS

Sastry, "A Model for Heating of Liquid-Particle Mixtures in a Continuous Flow Ohmic Heater", *Journal of Food Process Engineering,* 15 (1992), 263–278.

Sastry and Palaniappan, "Mathematical Modeling and Experimental Studies on Ohmic Heating of Liquid-Particle Mixtures in a Statis Heater", *Journal of Food Process Engineering,* 15 (1992) 241–261.

Margie J. Russell, "Live Long & Prosper", *Food Engineering,* Dec. 1992, pp. 77–80.

Sastry and Palaniappan, "Ohmic Heating of Liquid–Particle Mixtures", *Food Technology,* Dec. 1992, pp. 64–67.

Parrott, "Use of Ohmic Heating for Aseptic Processing of Food Particulates", *Food Technology,* Dec. 1992, pp. 68–72.

Knight et al., "The Baking Properties Of Pasteurized Whole Egg", Fd. Technol. (1967) 2, 143–167.

Murdock et al., "The Pasteurization Of Liquid Whole Egg", issued from the Office of Medical Research Council, 38, Old Queen Street, Westminster, S.W.I.

Hanson et al., "Pasteurization Of Liquid Egg Products".

Lennart Alkskog, "High Temperature pasteurization of Liquid Whole Egg", Process Technology, pp. 16–18.

Moller Madsen, "Pasteurizing of Egg Products", Sundhedsplejen (Dec. 1958), 102–105 and translation thereof.

Winter et al., "Pasteurization of Liquid Egg Products. III. Destruction of Salmonella in Liquid Whole Egg", American Journal of Public Health, (1946), 36, 451–460.

Winter et al., "Pasteurization of Liquid-Egg Products. I. Bacteria Reduction in Liquid Whole Egg and Improvement in Keeping Quality", Journal Paper No. J–1300 of the Town Agricultural Experimental Station, received from publication on Jun. 18, 1945, 229–245.

Hamid-Samimi et al., "Aseptic Packaging of Ultrapasteurized Egg. Design and Economic Considerations", publication date unknown, but a copy was transmitted to Mr. Merle Kirk under cover of a letter dated Aug. 21, 1985 from Prof. Hershell Ball, Jr.

"Electroheating", David Reznik, Dec. 1989.

*Primary Examiner*—Anthony J. Weier
*Attorney, Agent, or Firm*—Fish & Neave; Jeffrey H. Ingerman; Robert L. Lattuga

[57] ABSTRACT

The present invention relates to a method of electroheating and pasteurizing liquid egg and particularly liquid whole egg so as to provide an extended refrigerated shelf life. The method utilizes generally minimum pasteurization parameters coupled with packaging and storage at 40° F. or below.

12 Claims, 4 Drawing Sheets

U.S. PATENT DOCUMENTS

| | | |
|---|---|---|
| 1,813,064 | 7/1931 | Matzka . |
| 1,900,573 | 3/1933 | McArthur . |
| 2,200,405 | 5/1940 | Watson et al. . |
| 2,212,794 | 8/1940 | Salinski . |
| 2,282,024 | 5/1942 | Bitner . |
| 2,413,003 | 12/1946 | Sherman . |
| 2,425,422 | 8/1947 | De Tallada . |
| 2,469,709 | 5/1949 | Ashworth et al. . |
| 2,473,041 | 6/1949 | Urbain et al. . |
| 2,491,687 | 12/1949 | Nutt . |
| 2,495,415 | 1/1950 | Marshall . |
| 2,510,796 | 6/1950 | Brown . |
| 2,550,584 | 4/1951 | Mittelmann . |
| 2,564,579 | 8/1951 | Parmenter et al. . |
| 2,569,075 | 9/1951 | Schade . |
| 2,582,281 | 1/1952 | Robertson . |
| 2,585,970 | 2/1952 | Shaw . |
| 2,590,580 | 3/1952 | Schiavone . |
| 2,685,833 | 8/1954 | Hagopian . |
| 2,838,640 | 6/1958 | Mann et al. . |
| 2,877,118 | 8/1959 | Hensgen et al. . |
| 2,933,758 | 4/1960 | Moule . |
| 2,945,935 | 7/1960 | Messner et al. . |
| 3,060,297 | 10/1962 | Sargeant . |
| 3,072,490 | 1/1963 | Sargeant . |
| 3,082,710 | 3/1963 | Holland . |
| 3,113,872 | 12/1963 | Jones et al. . |
| 3,291,036 | 12/1966 | Perl . |
| 3,330,203 | 7/1967 | Korr . |
| 3,383,218 | 5/1968 | Jason et al. . |
| 3,537,387 | 11/1970 | Sierk et al. . |
| 3,543,673 | 12/1970 | McDevitt et al. . |
| 3,565,642 | 2/1971 | Hirsch et al. . |
| 3,590,725 | 7/1971 | Bilynsky . |
| 3,599,560 | 8/1971 | Clemens . |
| 3,632,962 | 1/1972 | Cherniak . |
| 3,651,753 | 3/1972 | Schmidt . |
| 3,669,003 | 6/1972 | King . |
| 3,715,975 | 2/1973 | King . |
| 3,771,433 | 11/1973 | King . |
| 3,842,724 | 10/1974 | Korr et al. . |
| 3,863,048 | 1/1975 | Buckley . |
| 3,877,360 | 4/1975 | Vigerstrom . |
| 3,886,290 | 5/1975 | Theimer et al. . |
| 3,948,159 | 4/1976 | Vigerstrom . |
| 3,966,972 | 6/1976 | Theimer et al. . |
| 3,997,678 | 12/1976 | Vigerstrom . |
| 4,091,119 | 5/1978 | Bach . |
| 4,099,454 | 7/1978 | Theimer et al. . |
| 4,100,302 | 7/1978 | Theimer et al. . |
| 4,108,052 | 8/1978 | Cunningham . |
| 4,109,566 | 8/1978 | Vigerstrom . |
| 4,177,719 | 12/1979 | Balaguer . |
| 4,303,820 | 12/1981 | Stottmann et al. . |
| 4,320,276 | 3/1982 | Takeuchi et al. . |
| 4,333,521 | 6/1982 | Stottman et al. . |
| 4,417,132 | 11/1983 | Simpson . |
| 4,434,357 | 2/1984 | Simpson et al. . |
| 4,457,221 | 7/1984 | Geren . |
| 4,496,594 | 1/1985 | Miyahara . |
| 4,522,834 | 6/1985 | Miyahara . |
| 4,554,440 | 11/1985 | Lee, Jr. . |
| 4,592,273 | 6/1986 | Yonezawa . |
| 4,612,199 | 9/1986 | Miyahara . |
| 4,695,472 | 9/1987 | Dunn et al. . |
| 4,739,140 | 4/1988 | Reznik . |
| 4,808,425 | 2/1989 | Swartzel et al. . |
| 4,838,154 | 6/1989 | Dunn et al. . |
| 4,957,759 | 9/1990 | Swartzel et al. ............... 426/521 |
| 4,957,760 | 9/1990 | Swartzel et al. . |
| 4,994,291 | 2/1991 | Swartzel et al. . |
| 5,019,407 | 5/1991 | Swartzel et al. . |
| 5,019,408 | 5/1991 | Swartzel et al. . |
| 5,048,404 | 9/1991 | Bushnell et al. . |
| 5,105,724 | 4/1992 | Swartzel et al. . |

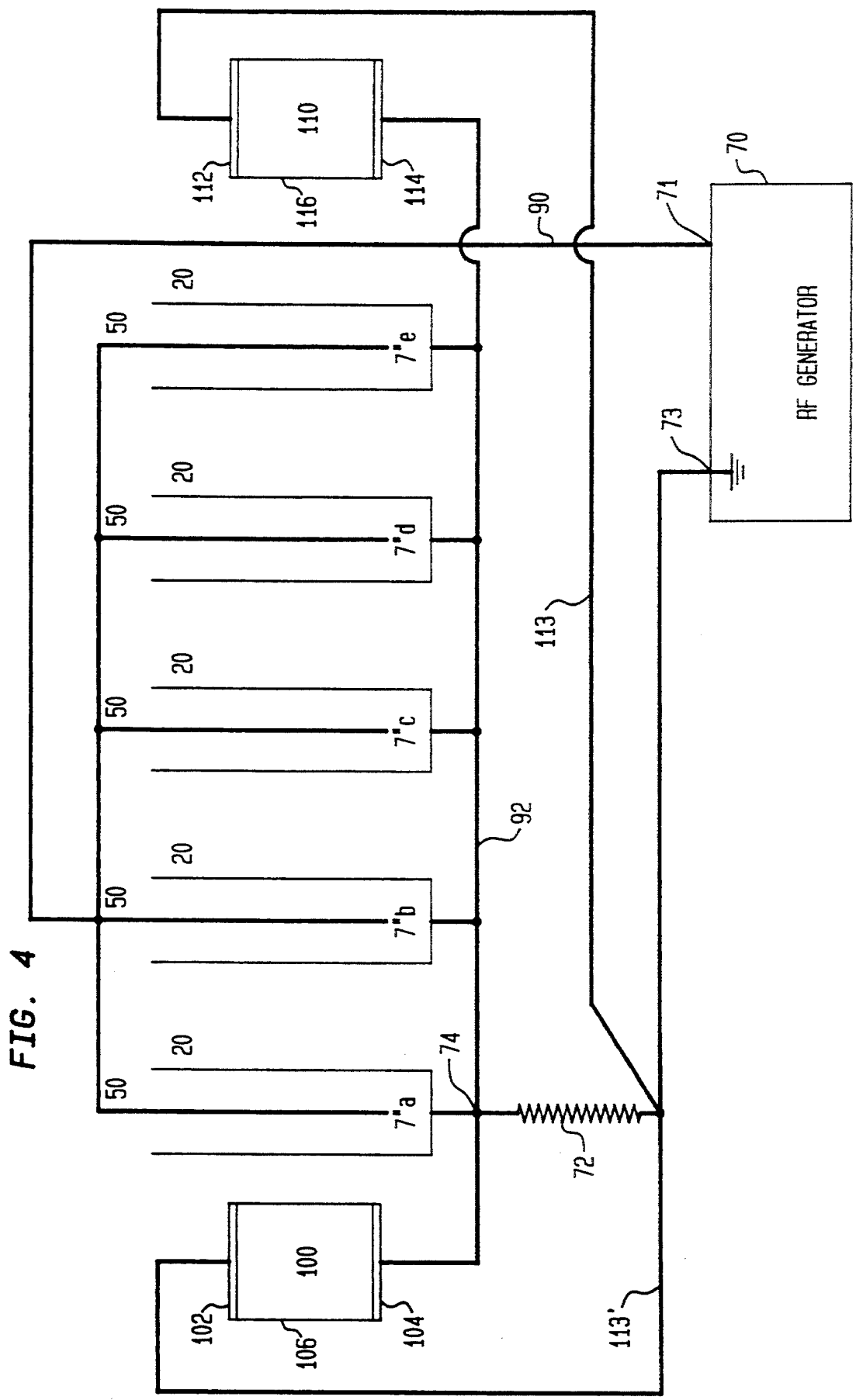

PRODUCING EXTENDED REFRIGERATED SHELF LIFE FOOD WITHOUT HIGH TEMPERATURE HEATING

This application is a continuation-in-part application of Ser. No. 07/862,198, filed Apr. 2, 1992 now U.S. Pat. No. 5,290,583.

FIELD OF THE INVENTION

The present invention relates to a method of providing food, and particularly liquid egg, with an extended refrigerated shelf life.

BACKGROUND OF THE INVENTION

In recent years, a number of techniques have been proposed for extending the refrigerated shelf life of food products which might contain pathogenic bacteria, spoilage bacteria, or both. Swartzel et al., U.S. Pat. No. 4,808,425, for example, suggests that extended refrigerated shelf life on the order of four weeks or more can be imparted to foods such as, for example, liquid whole egg. According to Swartzel et al., this can be accomplished by combining so-called "ultrapasteurization" conducted on continuous flow, high temperature, short time pasteurization equipment with aseptic packaging. Although it is somewhat difficult to determine exactly what holding temperature and time constitute "ultrapasteurization", from the discussion contained in Swartzel et al., it is clear from a review of the examples provided in Table II thereof that heating was conducted on conventional high temperature, short time commercial plate-type heat exchange thermal processing systems at temperatures in excess of 146° F. and up to approximately 162° F. and holding times ranging from about 2.7 seconds to about 3.2 minutes.

Dunn et al., U.S. Pat. No. 4,838,154 and its parent, U.S. Pat. No. 4,695,472 take a different approach. Dunn et al. discuss methods and apparatus for extending the shelf life of fluid food products including eggs by the repeated application of high voltage, high current density, discrete electric pulses to food products. Field strengths used are, at minimum, 5,000 volts/cm and voltages as high as, for example, 37,128 volts are disclosed. Direct current densities of at least about 12 amps/cm$^2$ are also disclosed as are pulse frequencies of between about 0.1 and 100. Preferably, the treatment involves the application of at least two and, more preferably, at least five discrete high energy pulses to the food being treated.

Dunn et al. suggest that different forms of energy, e.g. the application of different types of pulses, can result in different effects on the treated food. For example, Dunn et al. disclose the use of flat-top electric field pulses where heating is to be kept to a minimum, and exponentially decaying pulses where heating by electric field is beneficial.

Dunn et al. recognize the problems associated with electrolysis of the electrodes and the food being treated during the application of the pulsed energy high energy fields. Dunn et al. therefore propose a device including plate electrodes separated from the food being treated by a membrane and having an electrolyte placed therebetween in an attempt to mitigate this problem.

Dunn et al. teach that an extended refrigerated shelf life may be obtained in egg containing preservatives by the use of 30 pulses of electric energy having a peak voltage of 36,000 volts or more, a peak current of at least 9,600 amps and a final temperature of 136.4° F. Dunn et al. suggest, based on this test, that fluid egg product containing additives which is elevated in temperature to approximately 60° C. and stored at temperatures of about 4° C. can provide liquid egg with an extended refrigerated shelf life of 28 days or more.

The additives used in accordance with Dunn et al. are potassium sorbate and citric acid which are termed chemical preservatives. The effects of such additives on the refrigerated shelf life of liquid egg is demonstrated in FIG. 13 of Dunn et al. where a control which was treated using pulsed electric fields but which did not contain additives (1302-control) is compared to liquid egg containing additives which had been similarly treated and stored (1306-treated). A significant shelf life extension appears to be directly attributable to the presence of these additives.

SUMMARY OF THE INVENTION

It is an object of the present invention to provide for a method of pasteurizing food and, in particular, liquid whole egg.

It is further an object of the present invention to provide a method of imparting extended refrigerated shelf life to liquid whole egg.

Other objects will be readily apparent to those of ordinary skill in the art from a review of this application.

In accordance with these and other objects, the present invention provides a method of pasteurizing liquid whole egg so as to impart extended refrigerated shelf life thereto including the steps of: providing liquid whole egg; electroheating the liquid whole egg to a temperature of between about 140° F. and about 145° F. using AC electric current having a frequency effective to heat the liquid whole egg without electrolysis and to avoid detrimental coagulation; holding the electroheated liquid whole egg for a period of at least about 2.5 minutes; cooling the electroheated liquid whole egg; packaging the electroheated liquid whole egg; and storing the packaged electroheated liquid whole egg to a temperature of between about 32° F. and about 40° F. In particularly preferred embodiments, the frequency of the AC electric current used ranges from between about 100 kHz to about 450 kHz and more particularly from between about 150 kHz to about 450 kHz.

It has been discovered that by combining electroheating techniques such as those disclosed in U.S. Pat. No. 4,739,140 and in Ser. No. 07/862,198 filed on Apr. 2, 1992 now U.S. Pat. No. 5,290,583 in the name of David Reznik and Aloysius Knipper, the text of both being hereby incorporated by reference, when combined with proper packaging and proper storage, extended refrigerated shelf life liquid egg results. Moreover, these shelf lives can be achieved with or without the addition of preservative additives.

Liquid egg processed in accordance with the present invention has a maximum level of egg functionality as it has not been subjected to heating times and temperatures which can cause significant coagulation and/or denaturation. Furthermore, liquid egg produced in accordance with the present invention and properly stored as described herein is unexpectedly found to possess an extended refrigerated shelf life of at least six weeks and, more particularly, as many as 8 and 12 weeks or more, without the need for preservative additives or the use of extensive high voltage-high current electric pulse equipment. Most surprising, however, is the discovery that for extended refrigerated shelf lives of greater than six weeks, liquid whole egg need not be both "ultrapasteurized" as described by Swartzel et al. and aseptically packaged as described by Swartzel et al. In fact, extended refrigerated shelf lives of eight weeks or more can be achieved without using either aseptic packaging or "ultrapasteurization".

BRIEF DESCRIPTION OF THE DRAWINGS

The preferred embodiments of the present invention will be described in greater detail with reference to the accompanying drawings, wherein like members bear like reference numerals and wherein:

FIG. 4 is a simplified schematic drawing of the device of FIG. 3.

DETAILED DESCRIPTION OF THE PREFERRED EMBODIMENT

Figure 1:
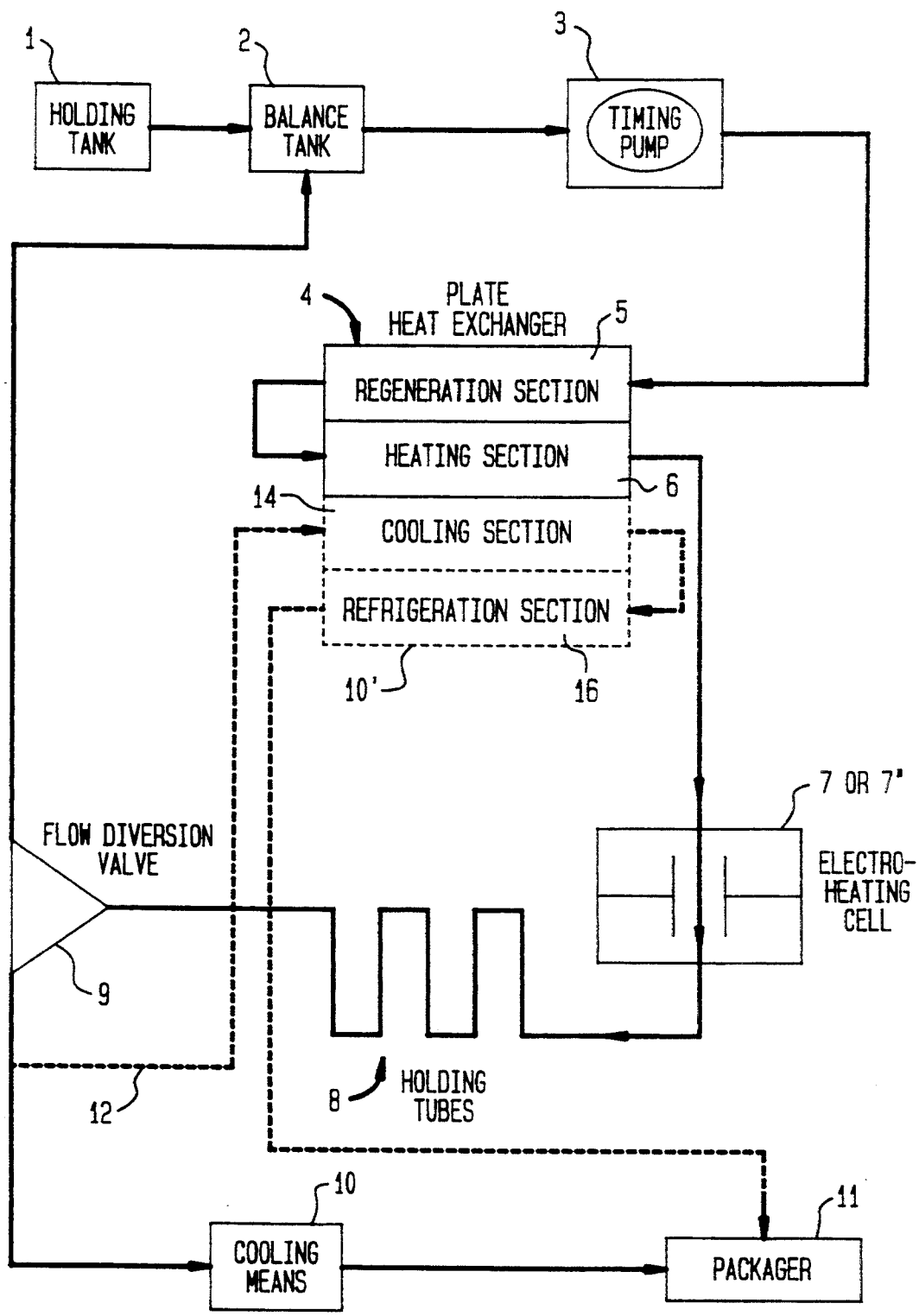
FIG. 1 is a schematic representation of one configuration of an electroheating pasteurizer of the present invention.

The term liquid egg in accordance with the present invention is meant to include not only liquid egg white and liquid egg yolk, but combinations of each in any predetermined or desirable ratio (referred to as "liquid whole egg"). The term liquid egg also includes liquid egg white, liquid egg yolk, or liquid whole egg with additives such as salt, sugar, milk, stabilizers, dextrins, cyclodextrins, enzymes, antibiotics, peroxides, acids such as citric acid and foodstuffs including solid or particulate foodstuffs. Liquid egg from which cholesterol has been removed is also included. While it is possible in accordance with the present invention to add stabilizers and acids, or, in fact, add peroxide during processing, the addition thereof is not necessary in accordance with the present invention to provide extended refrigerated shelf life of six weeks or greater.

As used herein, the terms "pasteurization", "pasteurize", and "pasteurized" refer to the killing of sufficient pathogenic microorganisms contained within liquid egg so as to render the liquid egg edible without threat of, for example, salmonella infection for a period of time. "Pasteurization" may also be thought of as a treatment which is designed to eliminate, for all practical purposes, pathogenic microorganisms and, secondarily, to reduce the number of spoilage microorganisms present to improve the keeping quality of the liquid egg product. The times and temperatures used which are sufficient to at least meet U.S. Department of Agriculture requirements for the pasteurization of liquid egg are as follows: Albumen (without use of chemicals) 134° F. and a holding time (average particle time) of 3½ minutes; whole egg 140° F., 3.5 minute holding time; and whole egg blends (less than 2% added non-egg ingredients), 142° F. and a 3.5 minute hold.

The term "extended refrigerated shelf life" in accordance with the present invention means that the liquid egg and, in particular, the liquid whole egg, is safe to consume for a period of at least about 6 weeks and, more preferably, greater than between about 8 and about 12 weeks or more. Extended refrigerated shelf life in accordance with the present invention requires, however, substantially continuous storage of the liquid egg at refrigerated temperatures of 40° F. or below just following pasteurization.

The term "electroheating" in accordance with the present invention is meant to encompass a process of generating heat in liquid egg by passing a current through the liquid egg. The liquid egg acts as a resistor and heat is generated thereby. A particularly preferred technique for electroheating food is described in U.S. Pat. No. 4,739,140 and another is described in U.S. patent application Ser. No. 07/862,198 filed Apr. 2, 1992 now U.S. Pat. No. 5,290,583 previously incorporated by reference herein.

"Electrolysis" is an electrochemical process which can be characterized by at least two specific phenomena. One form of electrolysis results in the dissolution of the metal electrodes inserted into the food being treated. As ions flow between a pair of electrodes, the metal at the surface of the electrodes becomes ionized by releasing electrons to positive ions in the food. The metal ions then dissolve into the food being treated. Another electrolytic problem is caused by the conversion of conductive ionic species within the food being treated to radicals and molecules such as the conversion of hydrogen ion to hydrogen atoms and then to hydrogen gas molecules. Similar processes take place with regard to chlorine, hydroxide ions and the like. These conversions can adversely impact the flavor and other advantageous qualities of the treated food both as the result of direct depletion of the ions and their conversion to other species and by initiating other reactions within the food such as oxidation and reduction.

"Detrimental coagulation" in accordance with the present invention refers to the coagulation of proteins within the liquid egg such that there are visible particles of egg and/or the loss of functionality. Through the practice of the present invention, liquid egg having viscosity, color, and pourability of shell egg and its components are maintained.

The methods and apparatus of the present invention will be better understood with reference to the schematic diagram of FIG. 1. Of course, devices of other configurations known to be useful in conjunction with the pasteurization of food and, in particular, the pasteurization of liquid egg can also be used. Liquid whole egg is transferred from holding tank 1, usually a refrigerated holding tank, to balance tank 2. Of course, liquid whole egg can be taken from a tank truck or tank car or directly from an egg breaking line as well. Thereafter, the liquid whole egg is pumped through a timing pump 3 which keeps the liquid whole egg moving throughout the entire pasteurization apparatus. The liquid whole egg is then preferably preheated. Any conventional means of heating can be utilized to preheat the liquid egg such as ovens, vats and/or steam infusion systems. In addition, electroheating cells can be used to preheat the liquid egg from refrigerated or ambient temperature up to about 144° F. Of course, if pasteurization will be conducted using temperatures of 140° F., the maximum preheating temperature utilized must be below 140° F.

A particularly preferred method of preheating, however, involves the use of a conventional plate heat exchanger 4. Liquid whole egg traveling from timing pump 3 is introduced into plate heat exchanger 4 and specifically into the regeneration or preheating section 5 thereof. After passing through the regeneration section 5, the temperature of the liquid whole egg is elevated from its initial temperature to a temperature of up to about 120° F. Thereafter, the liquid whole egg is introduced into heating section 6 of plate heat exchanger 4 where the temperature is further elevated to between about 120° F. and about 144° F. and, more preferably, between about 130° F. and about 139° F. Of course, it is possible to use a single stage heat exchanger to accomplish the entire preheating step or to use a heat exchanger having more than just two heating and/or regeneration sections to provide a more gradual heating thereto.

Thereafter, the liquid whole egg passes between at least two electrodes of an electroheating cell 7 and through the gap defined therebetween. In electroheating cell 7, high frequency electric current which is effective to heat the liquid egg without electrolysis is applied to the liquid egg in such a way so as to avoid detrimental coagulation. For example, liquid whole egg entering electroheating cell 7 from the aforementioned plate heat exchanger 4 would be elevated in temperature to from about 140° F. to about 145° F. and, more preferably, between a temperature greater than about 140° F. to about 145° F. The specifics of electroheating cell 7 are fully set forth in the aforementioned U.S. patent application Ser. No. 07/862,198 filed Apr. 2, 1992 now U.S. Pat. No. 5,290,583 which was previously incorporated by reference herein. Generally, however, liquid egg is transported between a pair of electrodes and high frequency alternating current is passed therethrough as previously described. In general, electroheating in accordance with the present invention uses a source of high frequency electric current which is operably and electrically connected to the electrodes. The term "high frequency" in accordance with the present invention is intended to include frequencies which are high enough to prevent the electrolysis of food products and the dissolution of the electrodes when in use and, more preferably, frequencies lying in the range of between approximately 100 Hz and 450 kHz. More preferably, high frequency in accordance with the present invention means the use of currents having a frequency of between about 100 kHz and about 450 kHz and, more preferably, between about 150 kHz and about 450 kHz.

In general, electroheating in accordance with the present invention utilizes electric fields having a strength of 1000 volts/cm or lower and usually, in practice, less than 500 volts/cm. Similarly, relatively low current densities are used. In fact, current densities of below about 5 amps/cm$^2$ are utilized. More preferably, current densities of less than about 3 amps/cm$^2$ are used and most preferably, the current densities used are about 1 amp/cm$^2$ or less.

The power supply or source of high frequency electric current used should be capable of providing a constant flow of energy to the liquid egg through the electrodes. In carrying out testing in accordance with the invention, a Westinghouse Pillar Industries Model 125K67, 100 KWatts RF generator was used. The generator was capable of operating at 100 Hz to 450 kHz and is rated at 200 KVA input for a 60 Hz line using 480 volts. The RF generator was operated at a frequency of about 170 KHz to about 220 KHz and about 38 KWatts to achieve a 5° F. temperature change at a flow rate of about 25,000 lbs. per hour. All repeated voltages are "peak to peak".

An alternate electroheater is also useful for carrying out the processes of the present invention.

Figure 2:
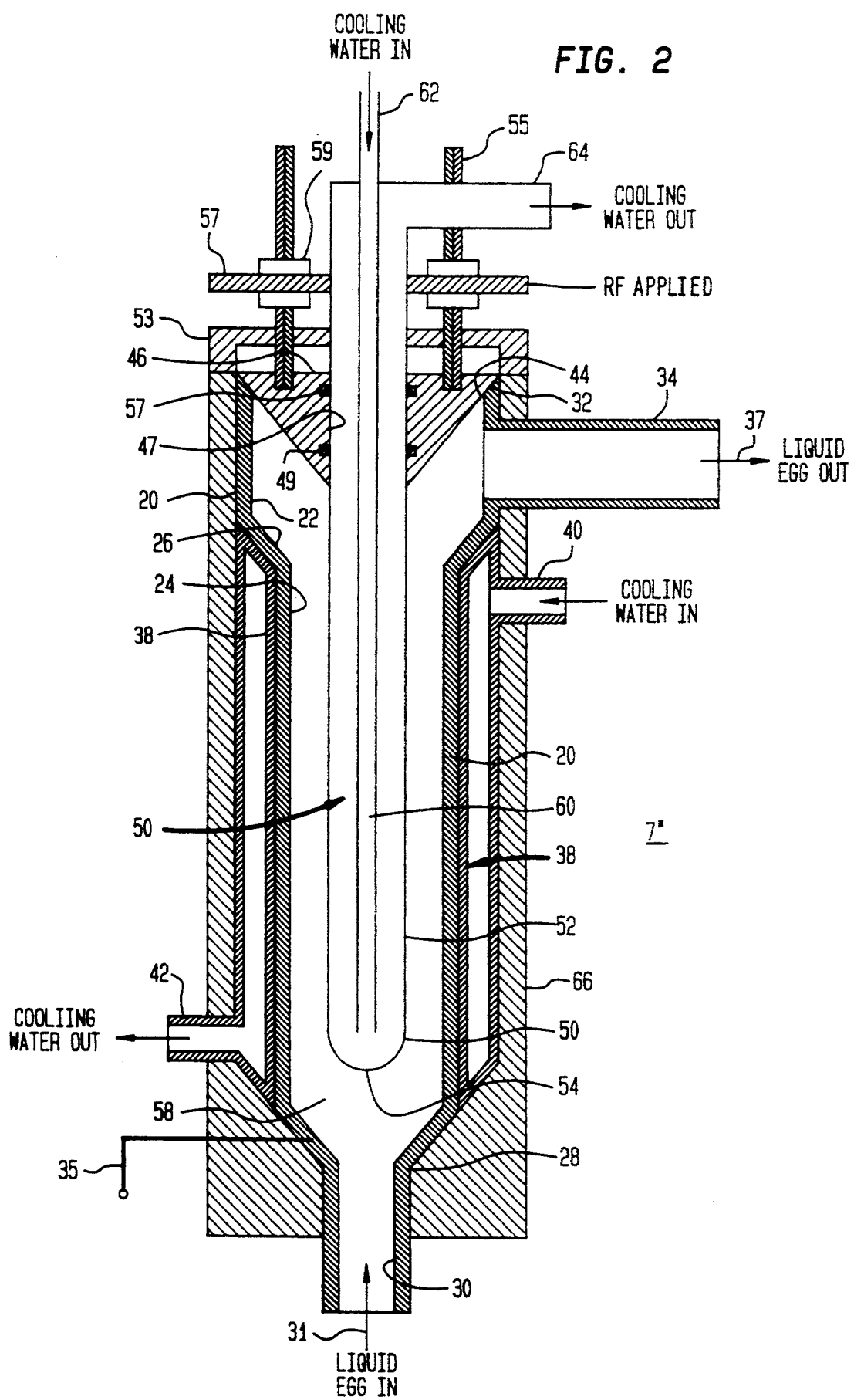
FIG. 2 is a side elevational view, in section, of a concentric electrode electroheating element constructed in accordance with the concepts of the invention.
Figure 3:
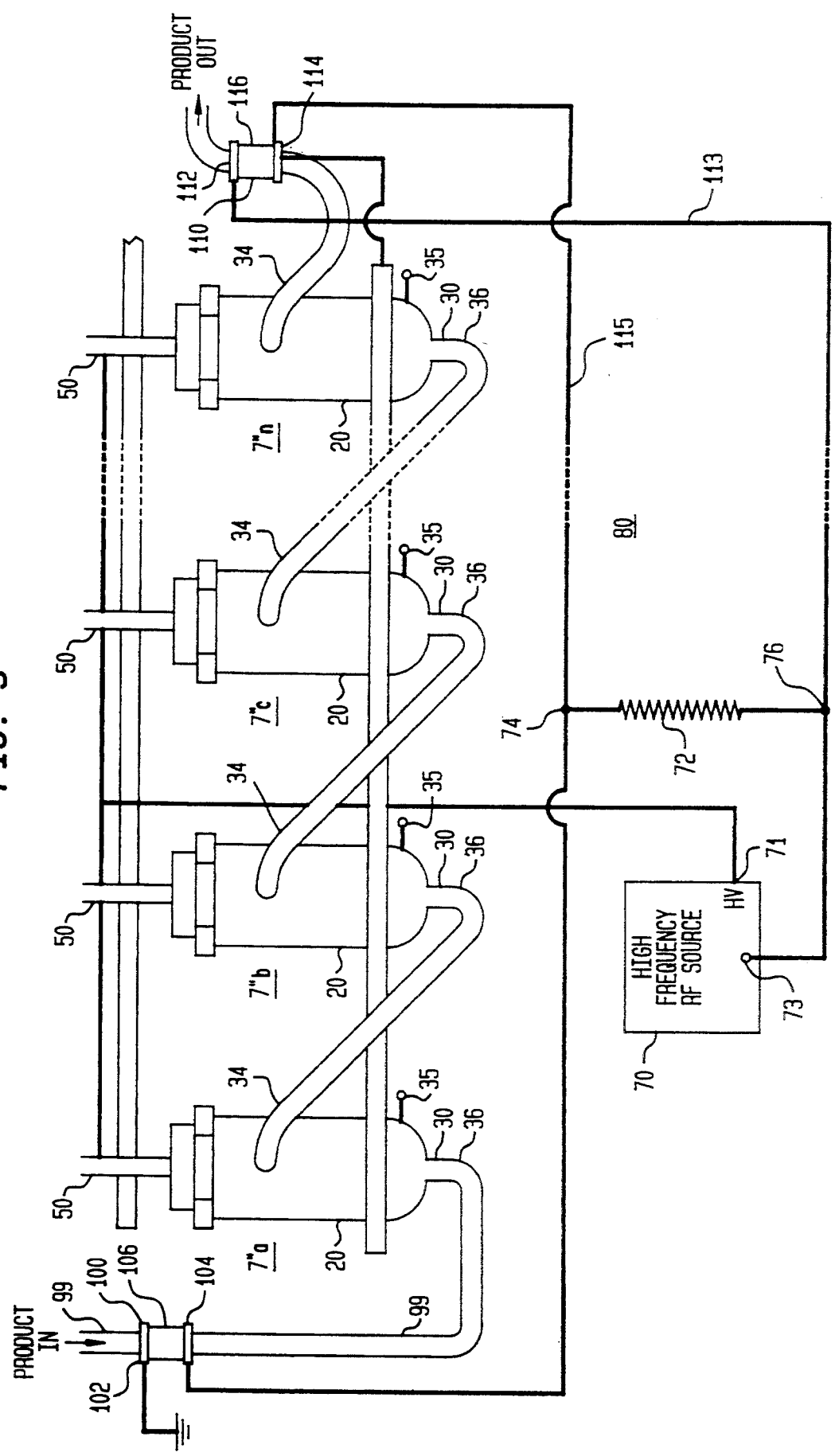
FIG. 3 is a somewhat schematic flow chart of a multi-step electroheating device utilizing concentric electrode of FIG. 2.

As is shown in FIG. 2 electroheating cell 7″ is made up of a body 20 which is stainless steel. Body 20 is the first electrode of the concentric electrode pair included in electroheating cell 7″. In a particularly preferred configuration, body 20 has a first cylindrical portion 22 and a second cylindrical portion 24 of a lesser outer diameter connected to the first cylindrical portion 22 by a tapered section 26. At the free end 28 of cylindrical portion 24 is an inlet tube 30 through which liquid egg may be introduced in the direction of arrow 31 into the gap between the electrodes as will be more fully described below. Adjacent the opposite free end 32 of the cylindrical portion 22 is an outlet tube 34 through which the electroheated food may exit in the direction of arrow 37 to holding tubes 8 or to further electroheating cells 7″. As illustrated in FIG. 3, outlet tube 34 of the leftmost electroheating cell 7″a is connected to the electroheating cell 7″b at inlet tube 30 thereof by means of suitable tubes or piping 36.

A cylindrical cooling jacket 38 can be placed about cylindrical portion 24 of body 20. An inlet tube 40 is provided to the cooling jacket 38 at the upper end of cylindrical portion 24 adjacent tapered portion 26 and an outlet tube 42 is provided adjacent the free end 28 of cylindrical portion 24. Fluids such as cold liquids (water, glycol or alcohol) or cooled gases may be circulated through cooling jacket 38 to help conduct away heat generated by the electroheating carried out within the cell 7″.

A jacket 66 of insulation or other protective of these materials may be placed outside of body 20 and cooling jacket 38 to prevent heat or cooling loss and/or to protect nearby operators.

Also placed in free end 32 of cylindrical portion 22 is an aperture 44 into which is fitted an insulator 46 which may be made of non-tracking materials of rubber, ceramics or plastic. In a preferred embodiment, the insulator 46 is made of DELRIN, a polyacetate homopolymer available from DuPont or CELCON, an acetyl copolymer available from Celanese Corporation.

Insulator 46 contains a central aperture 47 into which is placed the second or central electrode 50. A series of O-rings such as 49 and 51 are disposed in central aperture 47 which engage the outer surface of central electrode 50 when it is placed in aperture 47 of insulator 46 to prevent the passage of the liquid egg out of cell 7″ along the outside of central electrode 50 or the passage of external contaminants into the cell 7″ by the same route. Fitted above insulator 46 about the free end 32 of cylindrical portion 22 is a hollow cap 53. Two threaded studs 55 are anchored in insulator 46 at one end and exit via corresponding apertures in cap 53. The threaded studs 55 pass through corresponding apertures in a support plate 57. Adjustment nuts 59 are placed on the threaded studs 55 on adjacent both surfaces of support plate 57. The entire central electrode 50 can be moved upwardly within hollow cap 53 by tightening up on adjustment nuts 59 above the support plate 57, while the ones below plate 57 limit the extent of upward movement. By loosening the nuts 59 above plate 57 the entire central electrode 50 can be lowered into body 20 limited by the inclined shape of the insulator 46 itself.

The central electrode 50 is fabricated of stainless steel. Central electrode 50 may be made up of a central tube 52 with a rounded distal end 54 giving the general appearance of a test tube. A source of RF energy is connected to tube 52 via the support plate 57 which is electrically connected to each of the central electrodes 50 of each of the cells 7" of the electroheater so that the central electrodes 50 can act as the second electrode of the electroheating device. The source of high frequency AC electric current used was an RF generator which provided a constant current by varying the voltage.

A tube 60 is inserted into tube 52 so that its distal end is short of the distal end 54 of tube 52. A source of cooling fluid as previously described is connected to inlet 62 of tube 60 and allowed to flow out into tube 52 and are removed at outlet 64 at the opposite end of tube 52 from distal end 54.

Turning next to FIG. 3, there is shown a multi-cell electroheater including a plurality of sight glass electrode cells and the concentric electrode cells 7" just described. Sight glass electrode cell 100 is added at the product input line 99 to the first electroheating cell 7"a of the electroheater. The sight glass electrode cell 100 includes metallic end plates or conductive collars 102 and 104 separated by an insulative glass tube 106 of appropriate length, diameter and bore. The end plates 102 and 104 act as electrodes and current passes between them against and parallel to the flow of food as explained below. Glass tube 106 may be composed of an insulating glass material such as KIMAX brand heat resistant glass available from Kimble Glass. The end plates 102 and 104 include an aperture through which food can pass. In fact, the end plates 102 and 104 are generally just conductive pipe used to carry the liquid egg to and from the tube 106. A collar and seal are used to seat and attach the insulating tube 106.

Food enters the electroheater through conduit or input line 99 and it flows into electroheating cell 100. The food flows through the aperture in first electrode or end plate 102 into the interior of the hollow insulating member, glass tube 106. Finally, the food exits sight glass electrode cell 100 by passing through the aperture in end plate 104. End plate 104 is connected to one side 74 of a resistor or tank coil 72. The other side 76 of resistor or tank 72 is connected to the second terminal 73 of high frequency RF power source 70, which is the system ground. End plate 104 is also connected to the output of the concentric electrodes, common return 92, as described herein. End plate 102 is connected to system ground terminal 73 of power source 70 through lead 113'. Glass tube 106 has an inside diameter of about 2" and length of about 14".

A second sight glass electrode cell 110 is provided and is constructed in the same manner as sight glass electrode cell 100. This second sight glass electrode cell 110 is in fluid communication with outlet 34 of the concentric electrodes to receive food electroheated in cell 7"e. Electroheating cell 110 has an end plate 112 connected to the system ground terminal 73 of source 70 via lead 113. End plate 114 is connected to the side 74 of resistor or tank coil 72 and to said common return 92. A second glass tube 116 is disposed between the respective end plates 112 and 114. Each of said end plates or electrodes 112 and 114 have an aperture through which food enters the electroheating cell 110 and exits therefrom, thus exiting the electroheater. Glass tube 116 has an inside diameter of 2" and a length of 16". The remaining electroheating cells used are the concentric electrode containing cells 7".

In operation, food is electroheated in electroheating cell 100 by the passage of high frequency AC current from end plate 104 to end plate 102. The food then travels through inlet tube 30 into concentric electroheating cell 7"a and between electrodes 20 and 50 thereof. As illustrated in FIG. 3, once the food is electroheated again between electrodes 50 and 20 of electroheating cell 7"a, the liquid food flows through outlet tube 34 thereof which is connected to a second concentric electrode containing electroheating cell 7"b by means of a suitable tube or pipe 36. Concentric electrode containing electroheating cells 7"c 7"d and 7"e are connected to each other and to electroheating cell 7"b in the same manner that electroheating cell 7"b is connected to electroheating cell 7"a. After being electroheated in concentric electrode containing cell 7"e, the food exits through outlet 34 and then enters into sight glass electrode cell 110 where it is again electroheated. The food then leaves the electroheater through the aperture in electrode 112.

The flow of electric current through the system takes a quite different path. First, high frequency AC electric current leaves RF generator 70 through output 71 and is fed by lead 90 to the five concentric electrode containing parallel electroheating cells 7". (For illustration purposes, 3200 volts.) The high potential lead 90 is actually introduced directly into electroheating cell 7"b through electrode 50 thereof. Other leads take the energy to each of the other electrodes 50 of electroheating cells 7", respectively.

The average voltage drop across the gap between all electrodes 50 and electrodes 20 is, for example, 200 volts. Thus the voltage read at electrodes 20 should be approximately 3000 volts. The 200 volts drop is transferred to the food as heat. The current applied at about 38 KWatts power and 200 volt drop is about 190 amps. Of course, currents of up to about 400 amps or more are also contemplated. As shown in FIG. 4, the electrical energy remaining after electroheating food in electroheating cells 7" is then transferred to other portions of the electroheater by common return 92. In FIG. 4, common return 92 is shown as a lead. In fact, high frequency RF energy can travel along the outer skin of the concentric electrode containing cells 7" and from one cell to another via the pipes or conduits (inlet 99, inlets 30, outlet 34, connecting tube 36, and the like). Common return 92 conveys electric current to each of the sight glass electrodes 100 and 110 through end plates 104 and 114, respectively. Common return 92 is also connected to resistor or tank coil 72 at end 74 thereof which is arranged in series with the sight glass electrodes 100 and 110. Three thousand volts is therefore applied across tank coil 72 and across the sight glass electrodes 100 and 110.

To complete the current flow, the electric energy traverses the gap between end plate 104 and end plate 102 and end plate 114 and end plate 112, respectively, each of which is linked back to system ground 73 via leads 113' and 113, respectively. A second end 76 of resistor or tank coil 72 is also attached to system ground 73. The resistor or tank coil 72, in one embodiment, is a coil of copper tubing. In another embodiment, however, the tank coil or resistor 72 is merely a 20' or 30' long piece of copper tubing ($\frac{1}{4}$" to $\frac{3}{8}$" outside diameter). Although the copper tubing has a very low resistance, much lower than the resistance of, for example, liquid whole egg in the sight glass electrodes 100 and 110, it has an inductance which provides a sufficient voltage drop. Therefore, a substantial portion of the current of the system returns to system ground 73 through resistor or tank coil 72, thereby bypassing the sight glass electrodes 100 and 110. This explains why the sight glass electrodes described herein are relatively high voltage (3000 volts peak to peak) and relatively low current (approximately 15 amps calculated). Higher or lower currents are also contemplated. Such a device is disclosed in a U.S. patent application Ser No. 08/007,553 filed on Jan. 22, 1993 now abandoned, in the name of Thaddeus Polny and entitled "Methods and Apparatus for Electroheating Food Employing Concentric Electrodes."

After being electroheated as described herein, the electroheated liquid whole egg is then passed through holding tube 8 where it is held for a period of time sufficient to complete pasteurization in accordance with Federal Regulations. At conventional processing rates and temperatures ranging from between about 140° F. to about 145° F., liquid whole egg should be held for at least about 2.5 minutes and, more preferably, between about 3 and about 4 minutes. Most preferably, liquid whole egg is held for a period of time of about 3.5 minutes.

After the liquid whole egg has worked its way through holding tubes 8, it reaches flow diversion valve 9. If the temperature of the liquid egg exiting holding tubes 8 is below a preset value, then it is presumed that pasteurization has not been complete and the liquid egg is channeled back to balance tank 2 through flow diversion valve 9. If, however, the temperature of the liquid egg is at or higher than the preset temperature, the liquid whole egg is allowed to proceed to a means for cooling electroheated liquid egg 10.

When cooled in cooling device 10, the pasteurized electroheated liquid egg preferably returns to its refrigerated temperature of between about 32° F. and about 40° F. Cooling device 10 may be any device useful for cooling electroheated pasteurized liquid egg such as those described in the aforementioned U.S. patent application Ser. No. 07/862,198 filed Apr. 2, 1992 now U.S. Pat. No. 5,290,523. However, preferably, cooling device 10 is the cooling and refrigeration sections 14 and 16 respectively of plate heat exchanger 4. In FIG. 1, this is illustrated as 10'. In this configuration, liquid whole egg which has been pasteurized and held at the preset temperature for the required holding time exits flow diversion valve 9 and enters the cooling/regeneration section 4 of plate heat exchanger 4 through conduit 12. There, the liquid whole egg is cooled from its pasteurization temperature to a temperature of between about 120° F. and about 60° F. After leaving cooling/regeneration section 14 of plate heat exchanger 4, the cooled liquid whole egg enters refrigeration section 16 of plate heat exchanger 4 wherein it is cooled to a refrigerated temperature of greater than about 32° F. and lower than about 40° F.

Thereafter, the refrigerated liquid egg can be sent to a holding vessel for short term, long term or intermediate term storage, sent to a tank car or truck or, more preferably, sent directly to packaging device 11. Of course, as was the case with heating, it is possible to cool the liquid egg using a single section heat exchanger or a heat exchanger having more than two cooling sections. It is also possible to use a totally discrete plate heat exchanger. Cooling can also be accomplished by any other conventional method such as, for example, the use of refrigerators, the use of chilled gases, and the like.

Packaging device 11 need not be aseptic. The present inventors have realized that by the practice of the present invention including electroheating and storage at 40° F. or under, it is not necessary to aseptically package processed pasteurized liquid egg in order to obtain an extended refrigerated shelf life and, more particularly, an extended refrigerated shelf life of eight weeks or more. Aseptic packaging procedures are described in 21 C.F.R. §§ 113.3, 113.40(g) and 113.100(a)(4). Generally during aseptic processing, a commercially sterilized product is introduced into a sterile package under sterile conditions such that the filling and sealing of the package is all conducted in a sterile environment. Of course, liquid egg in accordance with the present invention and the majority of known technology is not sterile. Nonetheless, aseptic packaging procedures insure that a statistically insignificant number of cells are introduced during packaging. For purposes of illustration only, aseptic packaging should introduce approximately one cell per 1,000,000 packages. Aseptic packaging can be accomplished with, for example, using an International Paper Model SA aseptic packager or a Scholle Model 10-2E aseptic packager. Of course, aseptic packaging may be utilized in accordance with the present invention. However, by processing in accordance with the present invention, it need not be.

Another type of packaging useful in accordance with the present invention is the so-called "clean pack" which may be produced using a Cherry-Burrell packager Model EQ3 or EQ4. This type of packaging has a higher failure rate or, more correctly put, a higher incidence of the introduction of microorganisms during packaging than a truly aseptic system. For illustration purposes only, a clean pack may introduce one cell per every 100,000 packages. While the use of this packaging technology does not qualify as aseptic, it is certainly acceptable in terms of the present invention and such devices may be used as packaging device 11. These Cherry-Burrell packages can also be run so as to produce plain sanitized clean containers as discussed below. For example, if the packages are not treated with a peroxide spray prior to filling, they can be considered sanitized, but not aseptic or "clean packs".

Also useful in accordance with the present invention are plain sanitized clean containers produced and sanitized using "good manufacturing procedures" in accordance with all government regulations. Such containers which have been properly sanitized may introduce as many as, for illustration purposes only, one cell per hundred packages. Because of the superior kill provided by electroheating and the growth inhibitory effect of proper refrigerated storage, such an addition of cells is not considered significant.

These aforementioned packages which are all specifically useful in practicing the present invention to provide extended shelf life may be contrasted with a "dirty package" which has not been sanitized nor packaged under clean or aseptic conditions. Such containers may introduce 1,000 cells per package or more which is statistically significant relative to the number of cells remaining in pasteurized liquid egg after successful pasteurization. Of course, the introduction of any microorganisms after treatment is to be avoided at all costs. However, the packaging processes described herein do not significantly increase the total plate count and, therefore, should not affect refrigerated shelf life.

Again for illustration purposes, pasteurization at normal temperatures of between about 140° F. and about 145° F. through a conventional plate heat exchanger will result in liquid egg having approximately 100 cells per gram. The use of higher temperatures such as 150° F. or more may result in, for example, a 10 cells per gram. Electroheating in accordance with the present invention between about 140° F. and about 145° F. may provide a product containing one cell per gram. Based on one liter packages, the total cells per a liter package are 100,000, 10,000 and 1,000 respectively.

If electroheated liquid whole egg processed in accordance with the present invention is added to 100 one liter plain containers properly sanitized, using sanitary filling procedures, 99 of the resulting packages should contain 1,000 total cells with the one remaining package containing 1,001 total cells. As will be readily apparent, even using packages which have merely been sanitized, the number of cells introduced in packaging is relatively insignificant when compared to the number of cells introduced into the package in the liquid egg. It is only when "dirty packages" are used that a significant increase in cells is realized.

Other types of packages and packaging devices 11 may also be used. It is preferred that these packaging devices be capable of providing an extended shelf life package. These packaging devices and techniques include vacuum packaging, controlled atmosphere packaging, and modified atmosphere packaging can all be used.

The present inventors have found that by electroheating in accordance with the present invention utilizing high frequency alternating electric current and by maintaining the electroheated liquid egg at a refrigerated storage temperature of approximately 40° F. or below, tremendous advantages can be realized. The resulting liquid egg has most, if not all, of its original functionality and little, if no, detrimental coagulation. In addition, the liquid egg has an unusually low content of residual bacteria and, particularly, spoilage bacteria so that with proper refrigerated storage, extended refrigerated shelf life of eight weeks or more can be achieved. All of this is accomplished without the need for the use of high energy, high current equipment and without the need for stabilizers as suggested by Dunn et al. Furthermore, the resulting refrigerated shelf lives are 100% greater than those disclosed by Dunn et al.. Similarly, the result of the present invention can be achieved without the need for "ultrapasteurization" as described by Swartzel et al. and without the need for aseptic packaging.

The foregoing will be better understood with reference to the following examples. These examples are for the purposes of illustration. They are not to be considered limiting as to the scope and nature of the present invention.

EXAMPLE 1

Table Ready brand liquid whole egg was pasteurized at 142° F. utilizing an electroheating pasteurization device as illustrated in FIG. 1 and described herein. A Cherry-Burrell model EQ3 packager was used as packaging device 11, without use of a peroxide spray. The resulting packages can therefore be classified as sanitized packages, but not aseptic packages or "clean pack" packages as defined herein. Two pound sanitized gable top containers were used for packaging. Two pounds of citric acid per 1,500 lbs. of liquid whole egg was added to reduce the pH to between about 6.6 and about 6.9. This amount of citric acid is sufficient to prevent reactions with iron in the egg yolk which might otherwise turn the yolk green, but insufficient to provide any appreciable stabilization or preservative effect on the shelf life of the liquid egg. No other preservatives or stabilizers were used. After pasteurization and packaging, the liquid egg was stored at a temperature of between about 33° F. and about 34° F. Tests were immediately undertaken to determine the presence of *salmonella, listeria,* total plate count, *Coliform,* and *staphylococcus.* All testing utilized standard microbiological methods known in the industry. Initially, the liquid whole egg was negative for *salmonella, staphylococcus* and *listeria,* had an initial average total plate count of 95, and had less than 10 colonies of *Coliform.* After eight weeks, total plate count was 20, the *Coliform* was unchanged.

EXAMPLE 2

Table Ready brand liquid whole egg was pasteurized as described in Example 1. Initial tests for *salmonella* and *staphylococcus* were negative, the initial average total plate count was 22.5, less than 10 colonies of *Coliform* were present. *Listeria* was tested at four weeks on Nov. 30, 1992 and the tests conducted were negative. After eight weeks, the total plate count was 20, and the *Coliform* numbers were unchanged.

EXAMPLE 3

Table Ready brand liquid whole egg was pasteurized as described in Example 1. Initial tests for *salmonella, listeria* and *staphylococcus* were negative and *Coliform* showed less than 10 counts. The initial average total plate count was 32.5. After eight weeks, the total plate count was 20, and the *Coliform* count was unchanged.

EXAMPLE 4

Table Ready brand liquid whole egg was pasteurized as described in Example 1. Initial tests for *salmonella* and *staphylococcus* were negative, the initial *Coliform* count was less than ten. The initial average total plate count was 17.5. *Listeria* was tested after four weeks on Dec. 2, 1992 and the tests were negative. After eight weeks, the total plate count was 80 and the *Coliform* count was unchanged.

EXAMPLE 5

Table Ready brand liquid whole egg was pasteurized as described in Example 1. Initial testing for *salmonella, listeria* and *staphylococcus* was negative, *Coliform* was less than 10 counts, and the initial average total plate count was 15. After eight weeks, the total plate count was 10, and the *Coliform* numbers were unchanged.

The liquid whole egg resulting from the five foregoing examples was unspoiled, organoleptically superior and safe for general consumption and use even after eight weeks.

The principles, preferred embodiments, and modes of operation of the present invention have been described in the foregoing specification. The invention which is intended to be protected herein, however, is not to be construed as limited to the particular embodiments disclosed, since these are to be regarded as illustrative rather than restrictive. Variations and changes may be made by others without departing from the spirit and scope of the invention.

We claim:

1. A method of pasteurizing liquid whole egg so as to impart an extended refrigerated shelf life thereto comprising the steps of:
   providing liquid whole egg;
   electroheating said liquid whole egg to a temperature in the range of between about 140° F. and about 145° F. using alternating electric current having a frequency effective to heat said liquid whole egg without significant electrolysis and detrimental coagulation, holding said electroheated liquid whole egg for a period of at least about 2.5 minutes; cooling said electroheated liquid whole egg; packaging said electroheated liquid whole egg; and storing said electroheated packaged liquid whole egg at a temperature in the range of between about 32° F. and about 40° F.

2. The method of claim 1, wherein said frequency ranges between about 100 Hz and about 450 kHz.

3. The method of claim 2, wherein said frequency ranges between about 100 kHz and about 450 kHz.

4. The method of claim 3, wherein said frequency ranges between about 150 kHz and about 450 kHz.

5. The method of claim 1, wherein said liquid whole egg is electroheated to a temperature of between greater than 140° F. and about 145° F.

6. The method of claim 1, wherein said packaging step is aseptic.

7. The method of claim 1, wherein said packaging step is non-aseptic.

8. The method of claim 1, wherein said holding period is between about 3.0 and about 4 minutes.

9. The method of claim 8, wherein said holding period is about 3.5 minutes.

10. The method of claim 1, wherein said resulting packaged liquid whole egg has a refrigerated shelf life of at least about eight weeks.

11. The method of claim 1, wherein said liquid whole egg is preheated in a plate heat exchanger prior to said electroheating step.

12. A method of pasteurizing liquid whole egg so as to provide an extended refrigerated shelf life thereto comprising the steps of:

providing liquid whole egg;

electroheating said liquid whole egg to a temperature in the range of between about 140° F. and about 145° F. using alternating electric current having a frequency of between about 100 kHz and about 450 kHz, without significant electrolysis and detrimental coagulation;

holding said electroheated liquid egg for a period of about 3.5 minutes;

cooling said electroheated liquid egg, non-aseptically packaging said electroheated liquid egg;

and storing said electroheated liquid whole egg at a temperature in the range of between about 32° F. and about 40° F.;

wherein said electroheated packaged liquid whole egg has an extended refrigerated shelf life of at least about eight weeks.

* * * * *

UNITED STATES PATENT AND TRADEMARK OFFICE
CERTIFICATE OF CORRECTION

PATENT NO. : 5,415,882
DATED : May 16, 1995
INVENTOR(S) : Knipper et al.

It is certified that error appears in the above-indentified patent and that said Letters Patent is hereby corrected as shown below:

Cover page, column 2, line 16, "pasteurization" should be -- Pasteurization --.

Column 3, line 68, delete the number "10".

Column 13, line 2, delete the number "10".

Signed and Sealed this

Twenty-eighth Day of January, 1997

Attest:

BRUCE LEHMAN

Attesting Officer  Commissioner of Patents and Trademarks